United States Patent
Jayaram et al.

(10) Patent No.: US 11,275,795 B2
(45) Date of Patent: Mar. 15, 2022

(54) SYSTEM AND METHOD FOR IN-PLACE RECORD CONTENT MANAGEMENT

(71) Applicant: ORACLE INTERNATIONAL CORPORATION, Redwood Shores, CA (US)

(72) Inventors: Praveen Kumar Jayaram, Bangalore (IN); Shyam Babu Prasad, Bangalore (IN); Bhageerath Arasachetty, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 123 days.

(21) Appl. No.: 15/726,256

(22) Filed: Oct. 5, 2017

(65) Prior Publication Data

US 2019/0108225 A1    Apr. 11, 2019

(51) Int. Cl.
*G06F 16/00* (2019.01)
*G06F 16/93* (2019.01)
(Continued)

(52) U.S. Cl.
CPC ............ *G06F 16/93* (2019.01); *G06F 3/0482* (2013.01); *G06F 3/04817* (2013.01);
(Continued)

(58) Field of Classification Search
CPC .. G06F 3/0482; G06F 3/04817; G06F 16/245; G06F 16/93; G06F 16/285;
(Continued)

(56) References Cited

U.S. PATENT DOCUMENTS 6,938,021 B2 *  8/2005  Shear ................. G06Q 20/3674
                                                          705/67
7,707,176 B2    4/2010  Schmidt
(Continued)

OTHER PUBLICATIONS

"Declare any list or library item as a record", https://support.office.com/en-us/article/Declare-any-list-or-library-item-as-a-record-5d09480c-4b6b-4d3d-b46c-8b90a0f56f59, 4 pages, 2017.
(Continued)

*Primary Examiner* — Shiow-Jy Fan
(74) *Attorney, Agent, or Firm* — Tucker Ellis LLP

(57) ABSTRACT

In accordance with an embodiment, described herein is a system and method for enabling in-place record content management. A records management agent within a content management system can communicate with a records management system in an asynchronous manner, such as in response to a request or prompt, or in combination with check-in of content into the content management system. The records management agent can fetch a records folders hierarchy from the records management system for use in selecting record policies to be applied to content. The records management agent can associate content with selected records folders within the records folders hierarchy, and can update metadata corresponding to the content. The records management agent can send the updated metadata to the records management system. In an embodiment, the records management agent can be provided as a reusable, pluggable component within an existing content management system.

18 Claims, 6 Drawing Sheets

(51) Int. Cl.

| | |
|---|---|
| *G06F 3/0482* | (2013.01) |
| *G06F 3/04817* | (2022.01) |
| *G06F 16/13* | (2019.01) |
| *G06F 16/11* | (2019.01) |
| *G06F 16/16* | (2019.01) |
| *G06F 16/25* | (2019.01) |
| *G06F 16/28* | (2019.01) |
| *G06F 16/245* | (2019.01) |

(52) U.S. Cl.
CPC ............ *G06F 16/122* (2019.01); *G06F 16/13* (2019.01); *G06F 16/168* (2019.01); *G06F 16/245* (2019.01); *G06F 16/252* (2019.01); *G06F 16/285* (2019.01)

(58) Field of Classification Search
CPC .... G06F 16/122; G06F 16/168; G06F 16/252; G06F 16/13
USPC ........................................................ 707/694
See application file for complete search history.

(56) References Cited

U.S. PATENT DOCUMENTS

| | | | |
|---|---|---|---|
| 7,979,398 B2 | 7/2011 | DeBie | |
| 8,290,916 B2 | 10/2012 | Vu et al. | |
| 9,396,460 B2 | 7/2016 | Vedula | |
| 2006/0085374 A1* | 4/2006 | Mayes | G06F 16/353 |
| 2006/0230044 A1 | 10/2006 | Utiger | |
| 2006/0259468 A1 | 11/2006 | Brooks et al. | |
| 2009/0132548 A1* | 5/2009 | Kagawa | G06F 16/313 |
| 2009/0327262 A1* | 12/2009 | Grack | G06F 16/93 |
| 2011/0153578 A1* | 6/2011 | Pogodin | G06F 16/258 |
| | | | 707/694 |
| 2011/0238650 A1* | 9/2011 | Jenkins | G06Q 10/063 |
| | | | 707/706 |
| 2012/0203705 A1 | 8/2012 | Beneden et al. | |
| 2015/0220754 A1 | 8/2015 | Avery et al. | |
| 2016/0110371 A1 | 4/2016 | Wetherall et al. | |

OTHER PUBLICATIONS

Jackson, Joshua, "SharePoint 2013 in Place Records Management Overview", https://ecm.protiviti.com/blog/Lists/Posts/Post.aspx?ID=168, 4 pages, Nov. 19, 2014.

"OmniDocs Enterprise Content Management (ECM) Suite", http://www.newgensoft.com/products/enterprise-content-management-omnidocs/, 9 pages, 2017.

"HPE Content Manager", https://www.hpe.com/h20195/V2/GetPDF.aspx/4AA5-8147ENW.pdf, 12 pages, Jun. 2016.

* cited by examiner

SYSTEM AND METHOD FOR IN-PLACE RECORD CONTENT MANAGEMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to records management, and are particularly related to a system and method for enabling in-place record content management.

BACKGROUND

A records management system (RMS) enables management of content items designated as records, and application of policies to those records, for example to preserve content for historical, legal, or archival purposes. Records management systems can be used by an enterprise to both preserve content and dispose of content that is no longer needed.

Some content management systems can be configured to use an external records management system to apply record policies to content stored within a content management system. However, existing approaches involve waiting for the records management system to first discover content stored within the content management system before applying relevant record policies to the content. The discovery of new content (e.g., newly checked-in documents) by the records management system can involve a time delay during which the content is unprotected, which can increase the risk of misuse or inadvertent loss of content.

SUMMARY

In accordance with an embodiment, described herein is a system and method for enabling in-place record content management. A records management agent within a content management system can communicate with a records management system in an asynchronous manner, such as in response to a request or prompt, or in combination with check-in of content into the content management system. The records management agent can fetch a records folders hierarchy from the records management system for use in selecting record policies to be applied to content. The records management agent can associate content with selected records folders within the records folders hierarchy, and can update metadata corresponding to the content. The records management agent can send the updated metadata to the records management system. In an embodiment, the records management agent can be provided as a reusable, pluggable component within an existing content management system.

DETAILED DESCRIPTION

Figure 1:
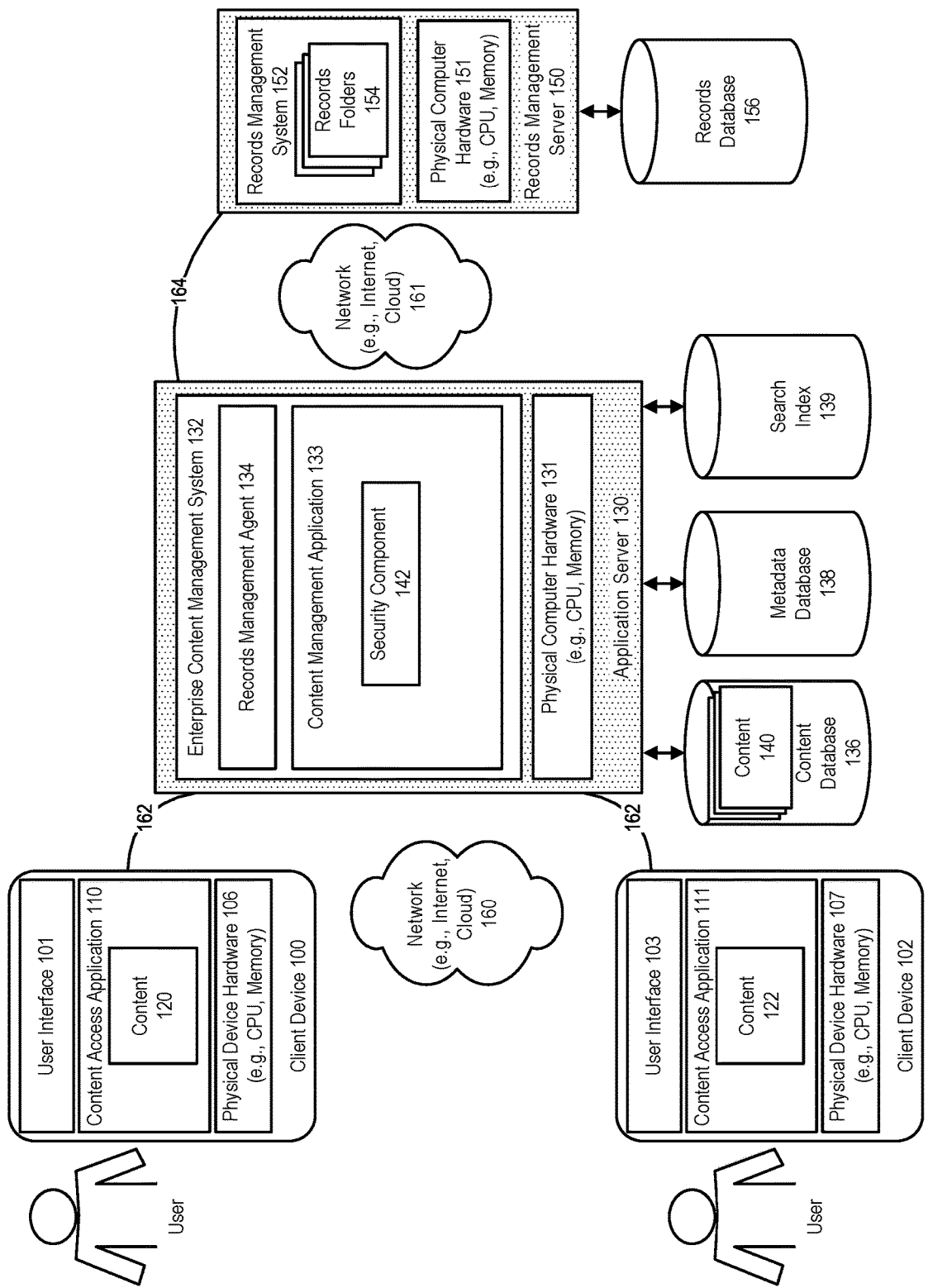
FIG. 1 illustrates a system for enabling in-place record content management, in accordance with an embodiment.

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

As described above, some content management systems can be configured to use an external records management system to apply record policies to content stored within or otherwise accessible via the content management system. However, existing approaches involve waiting for the records management system to first discover content stored within the content management system before applying relevant record policies to the content. The discovery of new content (e.g., newly checked-in documents) by the records management system can involve a time delay during which the content is unprotected, which can increase the risk of misuse or inadvertent loss of content.

In some cases, there could be large intervals of time between two consecutive discoveries of content items, such as when the records management system searches for new content based on a last modified date and time. A delay could also be involved when indexing content items before they can be discovered and protected. In such cases, users' options are limited to waiting until the records management system has eventually discovered and protected the content items, or performing a federated search manually within the records management system to protect the content items. However, each of these options involves delay and risk.

In accordance with an embodiment, described herein is a system and method for enabling in-place record content management. A records management agent within a content management system can be used to mark content as records and apply record policies to content, in response to a request or prompt, or in combination with check-in of content into the content management system. The records management agent can communicate with a records management system in an asynchronous manner, allowing record policies to be applied without waiting for content in the content management system to be discovered and leaving potential gaps for corporate compliance violations. The records management agent can fetch a records folders hierarchy from the records management system for use in selecting record policies to be applied to content, and can publish content metadata to the records management system asynchronously, to reflect the selected record policies.

In accordance with an embodiment, the records management agent can be configured to obtain an updated records folders hierarchy from the record management system according to a polling interval (e.g., a pre-configured polling interval), or to synchronize (or refresh) the records folders hierarchy asynchronously, such as in response to a request or prompt, or in combination with check-in of content.

In accordance with an embodiment, the records management agent can check-in or otherwise select content items that are not already marked as records, for association with particular records folders, and update their corresponding metadata accordingly. The records management agent can send (or publish) the updated metadata to the records management system, in response to a request (e.g., from a user of a content management system) or prompt, so that appropriate policies can be applied based on the associated records folders policies.

In accordance with an embodiment, the records management agent can also maintain a list (e.g., a database table) of favorite records folders associated with a particular user, for ease in navigating large or complex records folders.

In an embodiment, the records management agent can be provided as a reusable, pluggable component within an existing content management system.

In accordance with an embodiment, the records management agent avoids the delay associated with waiting for a records management system to discover new content before being able to apply record policies thereto. The records management agent can identify new content and mark the content as records, enabling record policies to be applied to sensitive content and reducing the risk of misuse or inadvertent loss of information. From the perspective of a user, the application of the record policy can seem immediate or instant.

FIG. 1 illustrates a system for enabling in-place record content management, in accordance with an embodiment.

As illustrated in FIG. 1, in accordance with an embodiment, for each of a plurality of client devices 100, 102 having a user interface 101, 103 and physical device hardware 106, 107 (e.g., CPU, memory), the client device can be provided with a content access application 110, 111 for execution thereon.

In accordance with an embodiment, the client device can communicate 162 with an application server 130 that includes a physical computer hardware 131 (e.g., CPU, memory) and an enterprise content management system 132.

In accordance with an embodiment, the content access application at the client device can communicate with the enterprise content management system via a network 160 (e.g., the Internet, or a cloud environment). The content access application can be configured to enable a user to view, upload, modify, delete, or otherwise access content such as content items 120, 122 at each client device. For example, new content can be added or uploaded to the enterprise content management system by a user interacting with the content access application on an associated client device. The content can then be transmitted to the enterprise content management system for storage.

In accordance with an embodiment, the enterprise content management system can be or include a platform for consolidating content that can be managed by a plurality of users of an enterprise. The enterprise content management system can include a content management application 133, which can be used, for example, to receive content uploaded to the enterprise content management system, and to provide stored content to a client device. The content management system can further include a security component 142. The security component can include or store security data including user permissions and privileges with respect to particular items of content and/or particular actions. For example, the security data can indicate that certain users are permitted to access, link, and/or modify certain documents.

In accordance with an embodiment, the enterprise content management system can be configured to communicate with a content database 136 for storing content (or content items) 140, and can deliver the content to users via their client devices. In accordance with an embodiment, the content database can be a relational database management system (RDBMS), file system, or other data source which the enterprise content management system can access. Content can include, for example, documents, files, e-mails, memos, images, videos, slide presentations, conversations, and user profiles. In accordance with an embodiment, the content management system can include an enterprise content management repository such as Oracle WebCenter Content (Oracle WCC).

In accordance with an embodiment, the enterprise content management system can be configured to associate metadata with the content. Metadata can include information about an item of content, such as its title, author, document identifier, release date, historical data such as last modified date, who has accessed the item and when, a location where the content is stored, and the like.

In accordance with an embodiment, the metadata can be stored in a metadata database 138. In accordance with an embodiment, the enterprise content management system can be configured to communicate with the metadata database to access metadata stored therein, and to update the stored metadata, for example to reflect the changes such as the marking of content as a record, and association of content with a records folder.

In accordance with an embodiment, the enterprise content management system can also be configured to communicate with a search index 139. The search index can be configured to provide indexing and searching of content and data stored in the content database and the metadata database. In accordance with an embodiment, the search index can be a relational database management system (RDBMS) or a search tool such as Oracle Secure Enterprise Search (Oracle SES).

In accordance with an embodiment, content stored within the content database can be checked out for modification by a user at the user's client device, and checked back in to the enterprise content management system.

In accordance with an embodiment, the enterprise content management system can communicate with a records management server 150 that includes a physical computer hardware 151 (e.g., CPU, memory) and a records management system 152, via a network 161 (e.g., the Internet, or a cloud environment). The records management system can be configured to enable management of content in the enterprise content management system designated as records, for example to preserve content for historical, legal, or archival purposes. The records management system can be configured to both preserve content and to dispose of content that is no longer needed. In accordance with an embodiment, the records management system can be a system for containing content management policies such as Oracle Universal Records Management (Oracle URM).

In accordance with an embodiment, the records management system can be used for retention of content where, for example, an enterprise is subject to regulations that require the retention of information for a specific period of time, or the enterprise has a litigation-related reason for retention management. The records management system can also be used for business-related reasons, such as providing a uniform infrastructure for retrieving and sharing content across an enterprise.

In accordance with an embodiment, the records management system can communication with a record database 156 for storing content marked as records. The records management system can also communicate with a metadata database for storing metadata associated with the records.

In accordance with an embodiment, the records management system can organize a plurality of records (or content items marked as records) into one or more categories. A category can be used, for example, to control access to or modification of content items, set retention time periods, and establish other policies for disposition of content. A plurality of records folders 154 associated with different categories can be created and organized according to a records folders hierarchy. A records folder can be used to organize similar content items within a category. Records folders can be nested within other records folders, can inherit record policies or rules from their parent records folder or category, and can specify further rules, permissions, or policies. Records folders can further be associated with record attributes such as "write restricted" or "write and delete restricted." Content items can be associated with a records folder (e.g., by being checked in to the records folder), so that record policies corresponding to the records folder are applied to the content items.

For example, in accordance with an embodiment, a records folder can correspond to a record policy specifying that content associated with the records folder should be retained for one month, after which it is to be deleted. A document marked as a record can be checked in to the records folder, and the records management system will apply the record policy to the document by instructing the content management system to retain the document for a period of one month, and then deleting the document.

In accordance with an embodiment, a content item can be marked as a record by associating the content item with a records folder and updating metadata associated with the content item. The records folder can correspond to a particular record policy or set of record policies, and can be included as part of a records folders hierarchy within the records management system.

In accordance with an embodiment, the records management system can store and implement a records folders hierarchy created, for example, by a user of the content management system. In accordance with an embodiment, each records folder within a records folders hierarchy can contain a group of content (e.g., similar content items) and can be associated with a record policy or set of record policies. The records folders hierarchy enables users to organize retained content into groups, each with its own retention and disposition characteristics. In accordance with an embodiment, users of the content management system can file items into records folders by using the user interface of the client device to select the desired content items and records folders.

In accordance with an embodiment, the enterprise content management system can further include a records management agent (or RMS agent) 134. The records management agent can be configured to communicate with the content access application at one or more associated client devices, and communicate with an external (remote) records management system.

The records management agent can, for example, act on behalf of the records management system to provide records folder information (e.g., an indication of a records folders hierarchy) to a client device, and to apply record policies contained within the records management system to content stored in the content management system. The records management agent can also send data corresponding to content in the content management system, such as metadata, to the records management system, in response to a request or a prompt, or in combination with check-in of content into the content management system. In an embodiment, the records management agent can be provided as a reusable, pluggable component within an existing content management system.

In accordance with an embodiment, the records management agent can receive a selection of a particular content item to be associated with a particular records folder (e.g., from a user of the content management system) and apply record policies to the content item, without waiting for the records management system to discover it. Additionally, in accordance with an embodiment, the system can receive be configured to receive a set of rules (e.g., a predefined set of metadata rules), based upon which the records management agent can select content items automatically (e.g., as soon as they are checked-in to the content management system, or at a later time), and mark them as records.

In accordance with an embodiment, rather than operating solely on a polling design to search for newly checked-in content within the content management system, the records management agent can publish metadata of newly checked-in content to the records management system asynchronously, thereby marking the selected content as a record and leaving no gap for corporate compliance violations.

In accordance with an embodiment, the system can provide an option to mark a particular records folders as favorites of a user. This can provide a more user-friendly alternative to a user, who does not have to search through a large and complex records folders hierarchy in order to find an appropriate records folder for a selected content item.

Figure 2:
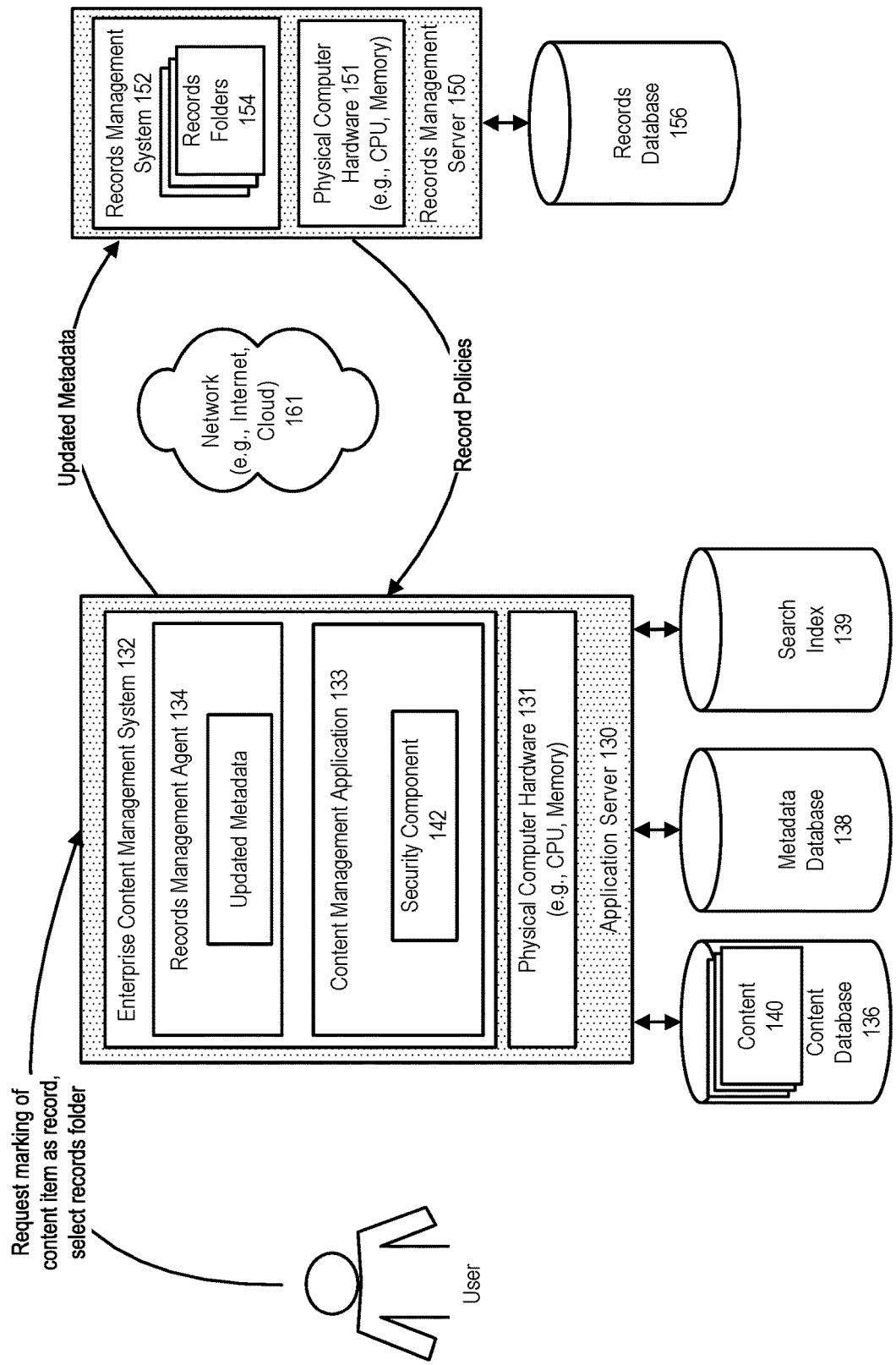
FIG. 2 illustrates a system for enabling in-place record content management, in accordance with an embodiment.

FIG. 2 illustrates a system for enabling in-place record content management, in accordance with an embodiment.

In accordance with an embodiment, the records management agent can be configured to communicate with the content access application at one or more associated client devices, and communicate with an external (remote) records management system.

In accordance with an embodiment, the records management agent can monitor, manage, and process communications between the content management system and the records management system. For example, the records management agent can communicate with the records management system to register its presence, so that the records management system is aware of the content available within the content management system, and is ready to manage the content. The records management agent can also communicate with the records management system to configuration information, such as obtaining identification and credentials/permissions data for records management security, defining searches, and mapping metadata fields between the content management system and the records management system to ensure that content is categorized correctly. The records management agent can send requests to the records management system for information such as record policies for particular content items and related metadata.

In accordance with an embodiment, the records management agent can synchronize with the records management system so that content synchronization operations can be performed. Synchronization operations can include, for example, uploading of new content into records folders, deletion of records, freezing of records, and marking of records for review.

In accordance with an embodiment, the records management agent can monitor content within the content management system by searching the content database and metadata database, and notifying the records management system of changes in the databases that can affect record policies (e.g., disposition processes or audit holds). For example, the record management system can notify the records management system of new content check-ins to be managed. The records management agent can also access and modify metadata associated with content in the content database, for example in response to requests received from client devices at the enterprise content management system. The records management agent can communicate with the records management system (e.g., by sending a request) to fetch or retrieve records folders hierarchies and associated record policies, for example in response to inputs received at client devices.

In accordance with an example embodiment, the records management agent can receive a request to mark a particular content item as a record, and in response thereto, retrieve an appropriate records folders hierarchy from the records management system. In response to a selection of a particular records folder within the records folders hierarchy, the records management agent can associate the particular content item with the particular records folder, and update metadata associated with the content item to reflect the association with the particular records folder. The metadata can include, for example, a document identifier, a last modified date, and a records folder identifier. The request can be initiated at a user interface of a client device, or can be a prompt automatically generated by the system in response to rules (e.g., a predefined set of rules) indicating which content should be marked as a record.

In accordance with an embodiment, the records management agent can act as a bridge between the content management system and the records management system. The records management agent can send information between the records management system and the content management system to enable the records management system to maintain an up-to-date catalog of content. The records management agent can obtain record policies from the records management system and apply them to content within the content management system. For example, the records management agent can perform tasks such as searching the content management system upon check-in of new content, to determine a list of new content items matching search criteria for management by the records management system.

In accordance with an embodiment, the records management agent can also provide logs for activities and communications that it coordinates, and can send the logs (or log files) to the record management system for storage.

Example Use Cases

Figure 3:
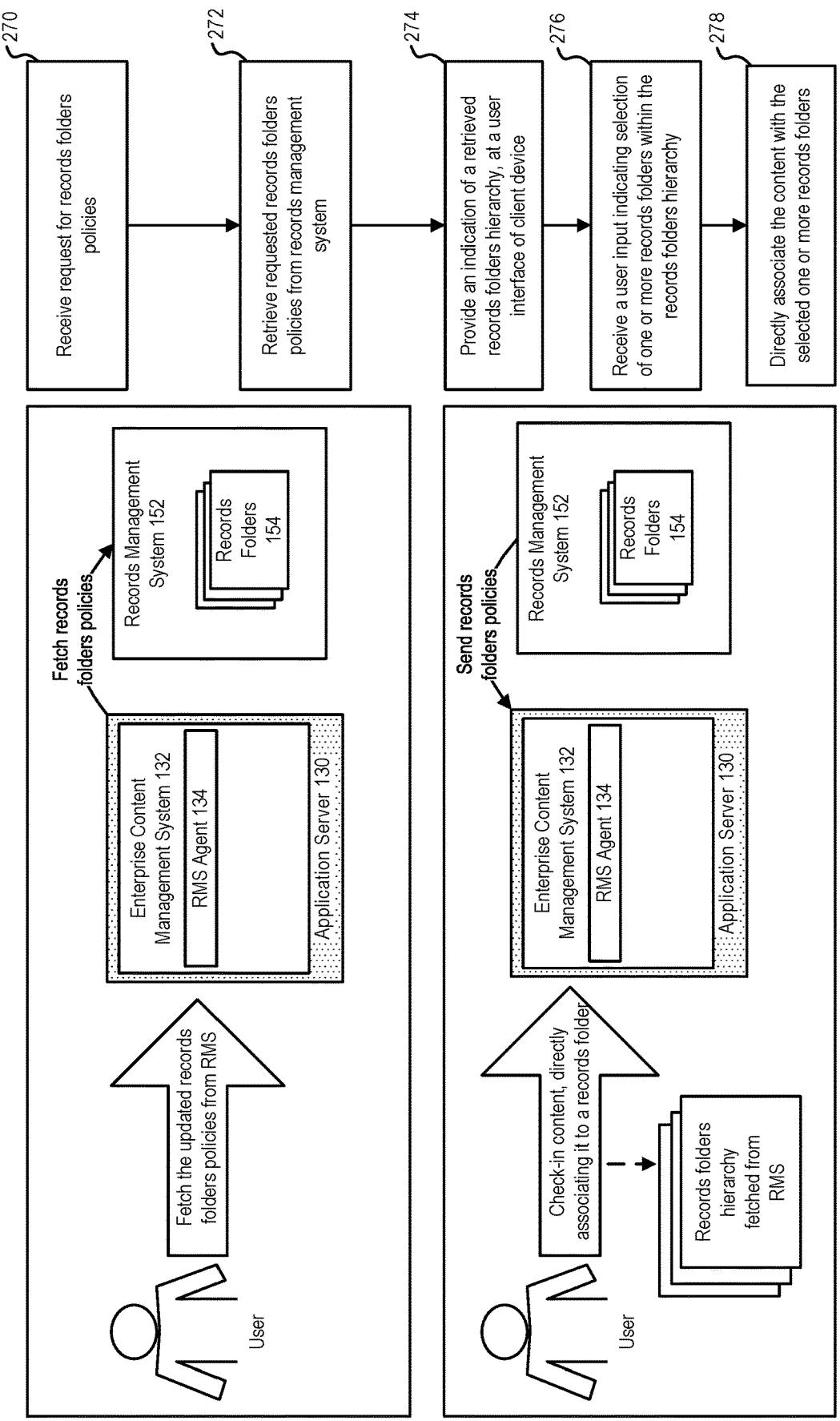
FIG. 3 illustrates enabling in-place record content management, in accordance with an embodiment.

FIG. 3 illustrates enabling in-place record content management, in accordance with an embodiment.

As illustrated in FIG. 3, at operation 270, the records management agent can receive a request for records folders policies.

For example, the content management system can receive a request in response to a user input, to fetch updated records folders policies from a record management system.

In accordance with an embodiment, at operation 272, the records management agent can retrieve the requested records folders policies from the records management system.

For example, the records management agent can synchronize with the records management system to obtain up-to-date records folders, in response to the request from the user.

In accordance with an embodiment, at operation 274, the records management agent can provide an indication of the retrieved records folders hierarchy corresponding to the retrieved records folders policies, at a user interface of a client device.

For example, the requested records folders policies can be organized according to a records folders hierarchy, and the records management agent, acting on behalf of the records management system, can present an indication of the records folders hierarchy at a user interface of the user's client device.

In accordance with an embodiment, at operation 276, the system can receive a user input indicative of associating a content with one or more of the records folders within the records folders hierarchy.

For example, the system can receive a user input at the user interface of the client device, indicating selection of one or more records folders within the presented records folders hierarchy for the content.

In accordance with an embodiment, at operation 278, the records management agent can, in response to the user input, directly associate the content with the selected one or more records folders.

For example, the records management agent can directly associate the content with the one or more selected records folders. Metadata corresponding to the content can be updated to indicate their association with the one or more selected records folders, and the content is marked as a record. The records management agent can send the updated metadata to the records management system.

In accordance with an embodiment, one or more records folders can also be marked as a favorite records folder by a user, and saved as part of the user's preferences or user profile.

Figure 4:
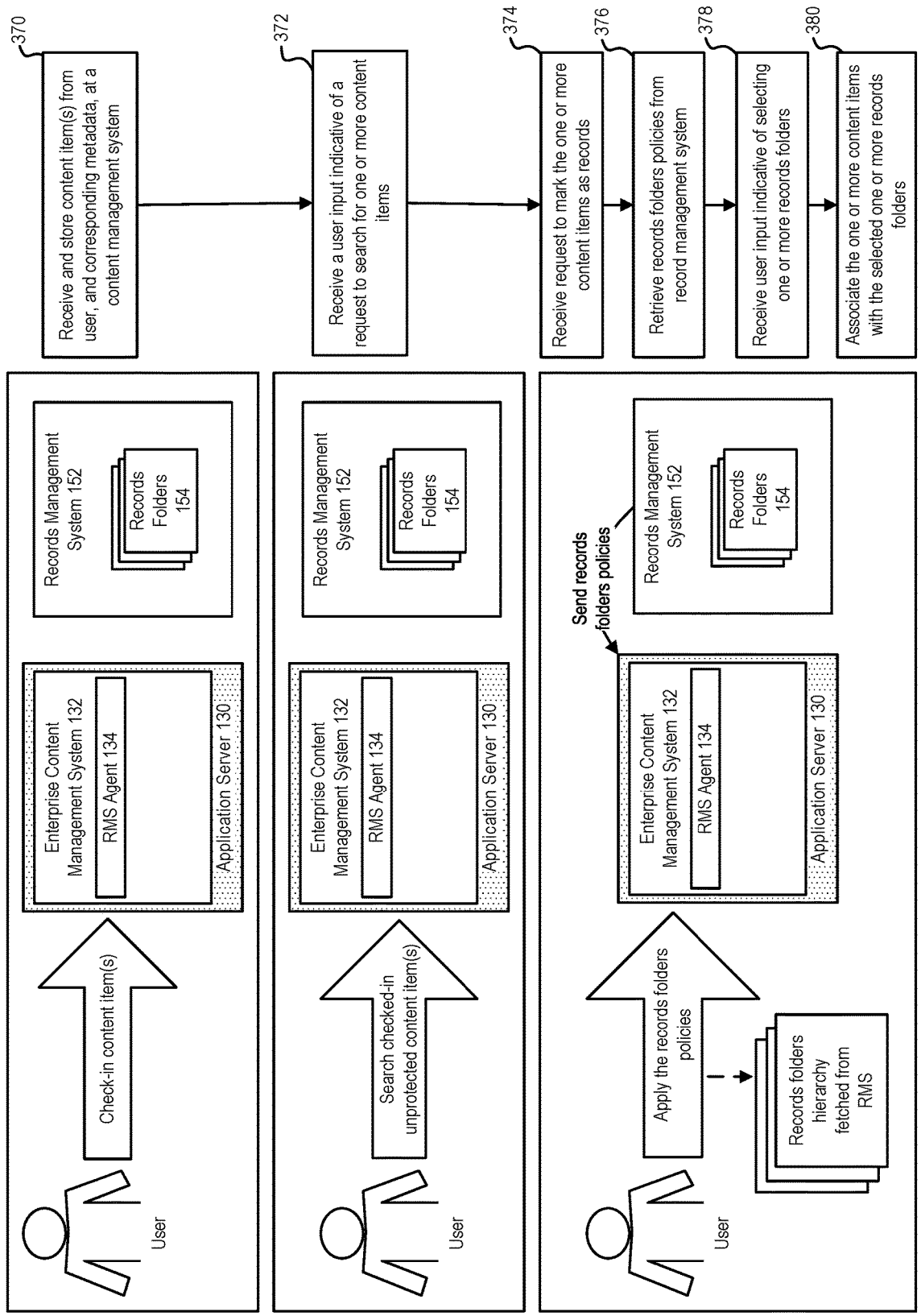
FIG. 4 illustrates enabling in-place record content management, in accordance with an embodiment.

FIG. 4 illustrates enabling in-place record content management, in accordance with an embodiment.

As illustrated in FIG. 4, at operation 370, the system can receive and store content item(s) and corresponding metadata at a content management system.

For example, the content management system can receive and store one or more content items uploaded by a user. The content items can be stored in a content database of the content management system, and the corresponding metadata can be stored in a metadata database of the content management system.

In accordance with an embodiment, at operation 372, the system can receive a user input indicative of a request to search for one or more content items within the content management system.

For example, the user can search for existing unprotected (e.g., not yet marked as a record) content items, to mark them as records. The content management system can receive a search request from the user, and can identify (present) one or more content items existing in the content management system, in response to the search request.

In accordance with an embodiment, at operation 374, the records management agent determines that a request has been received to mark the one or more content items as records.

For example, after presenting the one or more content items as search results, the content management system can receive a request (e.g., a user input indicative of a request) to mark the identified content item(s) as records. The records management agent can be configured to detect and determine receipt of the request.

In accordance with an embodiment, at operation 376, the records management agent can retrieve records folders policies from a record management system, in response to the request.

For example, the records management agent can retrieve, or otherwise receive data describing a records folders hierarchy from the records management system, and present the records folders hierarchy at a user interface of the user's client device. The records folders hierarchy can be presented, for example, in the form of a pop-up window presented in response to a selection of the content items being marked as records. The window can enable a user to select an appropriate records folder and define record attributes.

In accordance with an embodiment, at operation 378, the system receives a user input indicative of selecting one or more records folders within the records folders hierarchy for associating content therewith.

For example, a user can mark the content items found as a result of the search, as records, by selecting one or more records folders from within the presented records folders hierarchy to which the content items should be respectively assigned.

In accordance with an embodiment, at operation 380, the records management agent can, in response to the user input, associate the one or more content items with the selected one or more records folders.

For example, the records management agent can update metadata associated with the one or more content items, to reflect their association with the one or more records folders, and the content is marked as a record. The records management agent can send the updated metadata to the records management system.

Figure 5:
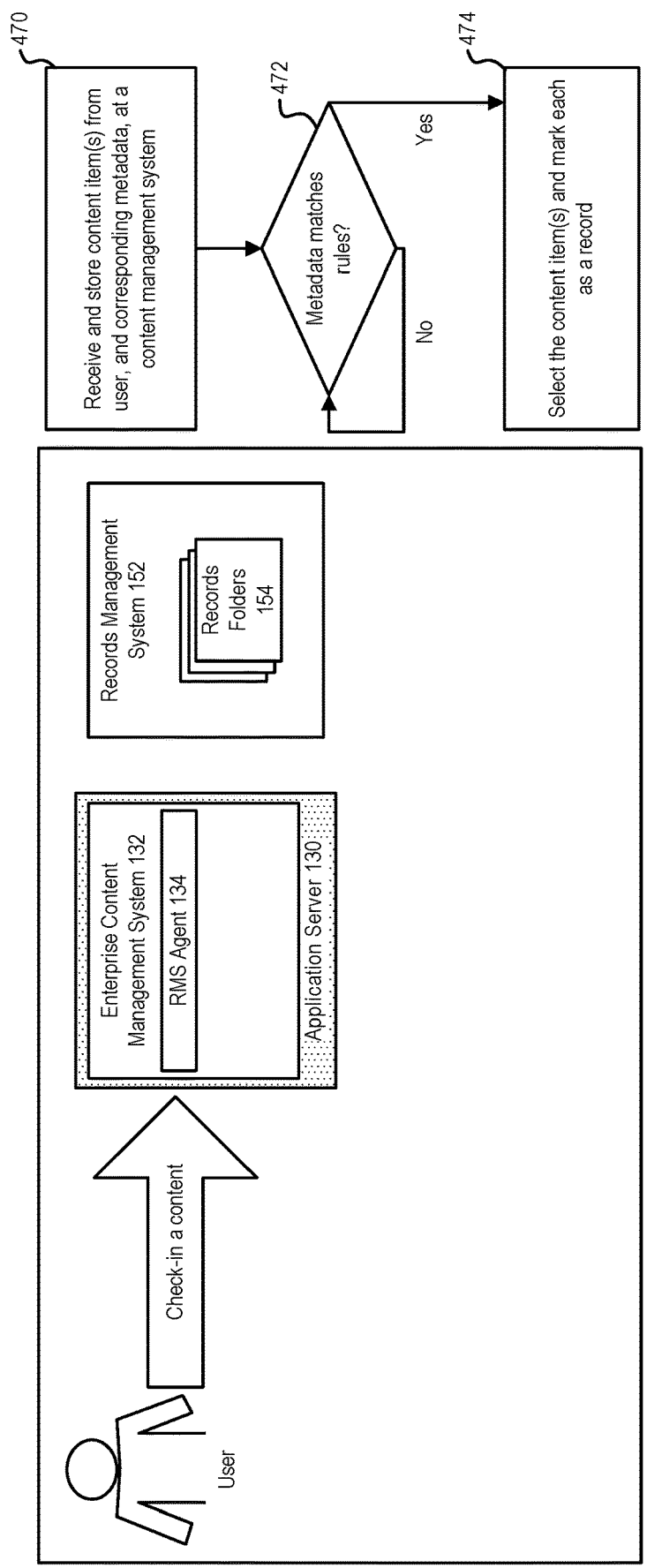
FIG. 5 illustrates enabling in-place record content management, in accordance with an embodiment.

FIG. 5 illustrates enabling in-place record content management, in accordance with an embodiment.

As illustrated in FIG. 5, at operation 470, the system can receive and store content item(s) and corresponding metadata at a content management system.

For example, the content management system can receive and store one or more content items checked in by a user.

In accordance with an embodiment, at operation 472, the records management agent can determine that metadata corresponding to one or more content items matches one or more rules for marking content as records.

For example, the records management agent can compare metadata corresponding to the checked-in content item(s) with rules (e.g., a predefined set of rules), and determine that the metadata matches and that the content item(s) should be marked as records.

In accordance with an embodiment, at operation 474, the records management agent selects the one or more content items and marks each as a record.

For example, the system can prompt the records management agent to select and directly associate the matching content item with one or more records folders indicated by the rules, without waiting for further user input. Metadata corresponding to the content can be updated to indicate its association with the one or more records folders, and the content is marked as a record. The records management agent can send the updated metadata to the records management system.

Figure 6:
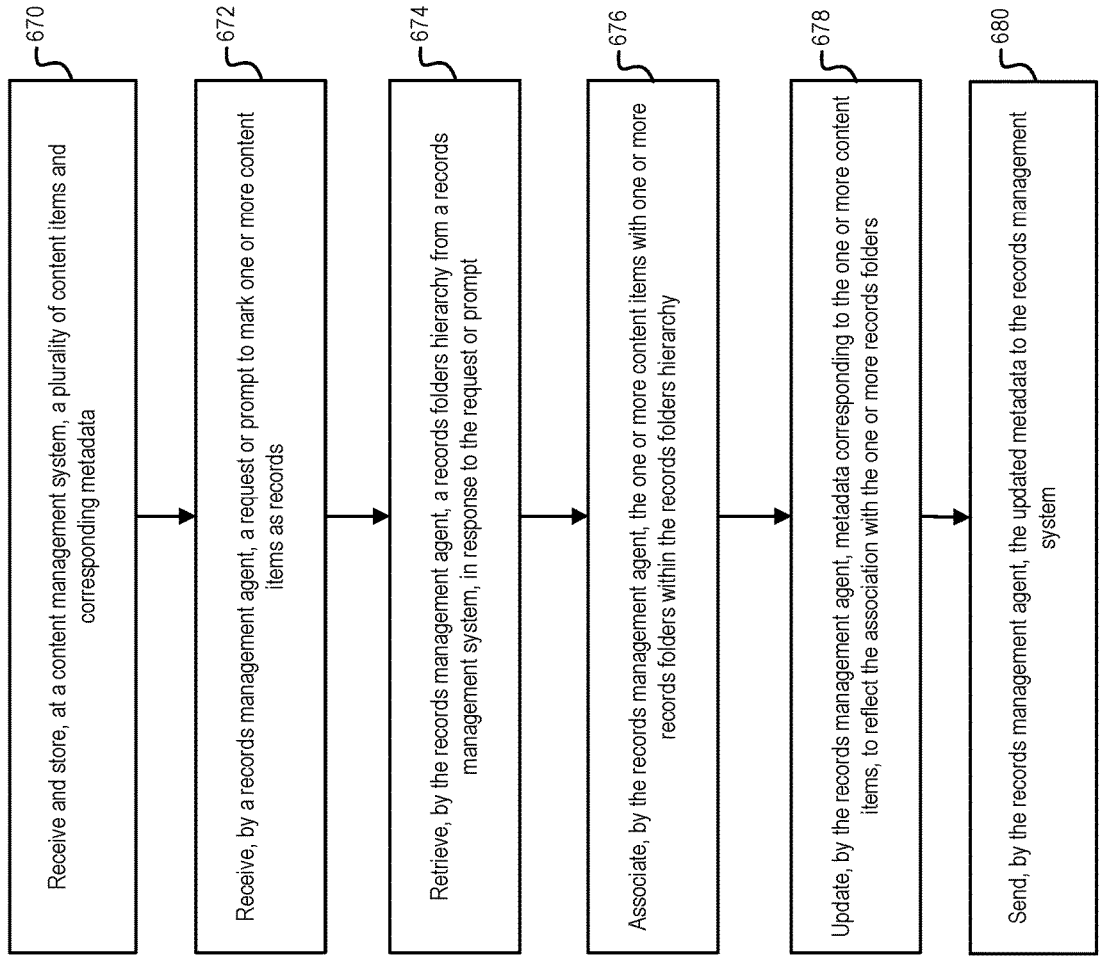
FIG. 6 illustrates a method of enabling in-place record content management, in accordance with an embodiment.

FIG. 6 illustrates a method of enabling in-place record content management, in accordance with an embodiment.

In accordance with an embodiment, at operation 670, the system is configured to receive and store, at a content management system, a plurality of content items and corresponding metadata.

In accordance with an embodiment, at operation 672, the system is configured to receive, by a records management agent, a request or prompt to mark one or more content items as records.

In accordance with an embodiment, at operation 674, the system is configured to retrieve, by the records management agent, a records folders hierarchy from a records management system, in response to the request or prompt.

In accordance with an embodiment, at operation 676, the system is configured to associate, by the records management agent, the one or more content items with one or more records folders within the records folders hierarchy.

In accordance with an embodiment, at operation 678, the system is configured to update, by the records management agent, metadata corresponding to the one or more content items, to reflect their association with the one or more records folders.

In accordance with an embodiment, at operation 680, the system is configured to send, by the records management agent, the updated metadata to the records management system.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in a cloud as part of, or as a service of, a cloud computing system based on shared, elastic resources delivered to users in a self-service, metered manner using Web technologies. Characteristics of the cloud can include on-demand self-service; broad network access; resource pooling; rapid elasticity; and measured service. Examples of cloud deployment models include: Public, Private, and Hybrid. Examples of cloud service models include Software as a Service (SaaS), Platform as a Service (PaaS), Database as a Service (DBaaS), and Infrastructure as a Service (IaaS). As used herein, the cloud can be a combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer readable medium is a non-transitory storage medium or non-transitory computer readable medium.

The foregoing description of the present invention has been provided for the purposes of illustration and description. It is not intended to be exhaustive or to limit the invention to the precise forms disclosed. Many modifications and variations will be apparent to the practitioner skilled in the art.

For example, while many of the embodiments described herein illustrate the use of a single records management agent, embodiments are not limited thereto, and multiple records management agents can be used with the records management system to provide management of records.

Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may be incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for in-place records management, the system comprising:
    a server including a processor and a content management system configured to store a plurality of content items associated with respective metadata, wherein the content management system comprises a records management agent in communication with a records management system,
    wherein the records management agent is configured to:
        communicate with the records management system to receive configuration information, record policies, and a mapping of metadata fields between the content management system and the records management system for use in categorizing content;
        monitor changes to content within the content management system, and notifying the records management system of changes that affect the record policies;
        receive, from a client device, a request or prompt to mark a particular content item of the plurality of content items stored at the content management system as a record;
        retrieve, from the records management system, in response to the request or prompt to mark the particular content item as a record, data describing a records folders hierarchy, wherein the records folders hierarchy comprises a plurality of records folders, each of which records folders is associated with a record policy; and
        receive a selection of the particular content item to be associated with a particular records folder, from a user of the content management system, and proactively apply record policies to the particular content item, including:
            associate the particular content item stored at the content management system and to be marked as a record with a selected records folder within the records folders hierarchy; and
            update metadata associated with the particular content item stored at the content management system, wherein the metadata includes a document identifier, a document modified date, and a records folder identifier, to reflect the association of the particular content item with the selected records folder;
    wherein the metadata associated with the particular content item stored at the content management system and as updated is provided, by the records management agent, to the records management system, for use by the records management system in controlling access to the record and the particular content item stored at the content management system.

2. The system of claim 1, wherein each records folder is associated with one or more record attributes, including a write, read, or deletion restriction.

3. The system of claim 1, wherein the record policy describes a retention or disposition operation to be performed with respect to content items in an associated records folder.

4. The system of claim 1, wherein the records management agent is further configured to:

receive, at a user interface of the client device in communication with the content management system, an input indicative of checking in content into the content management system, provide, at the user interface, an indication of the records folders hierarchy, receive, at the user interface, an input indicative of the selected records folder within the records folders hierarchy, and associate the content to be checked in, with the selected records folder, in response to the input.

5. The system of claim 1, wherein the records management agent is further configured to:

receive, at a user interface of the client device in communication with the content management system, a request to search for existing content within the content management system, provide, at the user interface, an indication of the records folders hierarchy, receive, at the user interface, an input indicative of the selected records folder within the records folders hierarchy, and associate the searched-for content with the selected records folder, in response to the input.

6. The system of claim 1, wherein the records management agent is further configured to:

receive, at a user interface of the client device in communication with the content management system, an input indicative of checking in content into the content management system, determine a match between metadata associated with the content to be checked in, and one or more rules corresponding to the selected records folder, and in response to determining the match, associate the content to be checked in, with the selected records folder.

7. A method for in-place records management, the method comprising:

providing, at a server including a processor and a content management system, access to a plurality of stored content items associated with respective metadata, wherein the content management system comprises a records management agent in communication with a records management system;

communicating, by the records management agent, with the records management system to receive configuration information, record policies, and a mapping of metadata fields between the content management system and the records management system for use in categorizing content;

monitoring, by the records management agent, changes to content within the content management system, and notifying the records management system of any changes that affect the record policies;

receiving, at the records management agent, from a client device, a request or prompt to mark a particular content item of the plurality of content items stored at the content management system as a record;

retrieving, at the records management agent, from the records management system, in response to the request or prompt to mark the particular content item as a record, data describing a records folders hierarchy, wherein the records folders hierarchy comprises a plurality of records folders, each of which records folders is associated with a record policy; and receiving a selection of the particular content item to be associated with a particular records folder, from a user of the content management system, and proactively apply record policies to the particular content item, including:

associating the particular content item stored at the content management system and to be marked as a record with a selected records folder within the records folders hierarchy; and updating metadata associated with the particular content item stored at the content management system, wherein the metadata includes a document identifier, a document modified date, and a records folder identifier, to reflect the association of the particular content item with the selected records folder;

wherein the metadata associated with the particular content item stored at the content management system and as updated is provided, by the records management agent, to the records management system, for use by the records management system in controlling access to the record and the particular content item stored at the content management system.

8. The system of claim 1, wherein the content management system includes a security component that stores security data including user permissions and privileges with respect to particular content items stored at the content management system and/or particular actions associated with the particular content items stored at the content management system.

9. The system of claim 1, wherein the records management agent is adapted to receive a selection of a particular content item to be associated with a particular records folder, from a user of the content management system, and apply record policies to the particular content item, without waiting for the records management system to discover the particular content item.

10. The system of claim 1, wherein the records management agent is adapted to obtain record policies from the records management system and apply the record policies to content items stored at the content management system, including that the records management agent performs tasks including searching the content management system upon check-in of new content, to determine content items matching search criteria for management by the records management system.

11. The method of claim 7, wherein the record policy describes a retention or disposition operation to be performed with respect to content items in an associated records folder.

12. The method of claim 7, further comprising:

receiving, at a user interface of the client device in communication with the content management system, an input indicative of checking in content into the content management system;

providing, at the user interface, an indication of the records folders hierarchy;

receiving, at the user interface, an input indicative of the selected records folder within the records folders hierarchy; and associating the content to be checked in, with the selected records folder, in response to the input.

13. The method of claim 7, further comprising:

receiving, at a user interface of the client device in communication with the content management system, a request to search for existing content within the content management system;

providing, at the user interface, an indication of the records folders hierarchy;

receiving, at the user interface, an input indicative of the selected records folder within the records folders hierarchy; and associating the searched-for content with the selected records folder, in response to the input.

14. The method of claim 7, further comprising:

receiving, at a user interface of the client device in communication with the content management system, an input indicative of checking in content into the content management system;

determining a match between metadata associated with the content to be checked in, and one or more rules corresponding to the selected records folder; and in response to determining the match, associating the content to be checked in, with the selected records folder.

15. A non-transitory computer-readable storage medium, including instructions stored therein which when read and executed by a computer including a processor, cause the processor to perform a method comprising:

providing, at a server including a processor and a content management system operating thereon, access to a plurality of stored content items associated with respective metadata, wherein the content management system comprises a records management agent in communication with a records management system;

communicating, by the records management agent, with the records management system to receive configuration information, record policies, and a mapping of metadata fields between the content management system and the records management system for use in categorizing content;

monitoring, by the records management agent, changes to content within the content management system, and notifying the records management system of any changes that affect the record policies;

receiving, at the records management agent, from a client device, a request or prompt to mark a particular content item of the plurality of content items stored at the content management system as a record;

retrieving, at the records management agent, from the records management system, in response to the request or prompt to mark the particular content item as a record, data describing a records folders hierarchy, wherein the records folders hierarchy comprises a plurality of records folders, each of which records folders is associated with a record policy; and receiving a selection of the particular content item to be associated with a particular records folder, from a user of the content management system, and proactively apply record policies to the particular content item, including:

associating the particular content item stored at the content management system and to be marked as a record with a selected records folder within the records folders hierarchy; and updating metadata associated with the particular content item stored at the content management system, wherein the metadata includes a document identifier, a document modified date, and a records folder identifier, to reflect the association of the particular content item with the selected records folder;

wherein the metadata associated with the particular content item stored at the content management system and as updated is provided, by the records management agent, to the records management system, for use by the records management system in controlling access to the record and the particular content item stored at the content management system.

16. The non-transitory computer readable storage medium of claim 15, wherein the instructions further cause the processor to:

receive, at a user interface of the client device in communication with the content management system, an input indicative of checking in content into the content management system;

provide, at the user interface, an indication of the records folders hierarchy;

receive, at the user interface, an input indicative of the selected records folder within the records folders hierarchy; and associate the content to be checked in, with the selected records folder, in response to the input.

17. The non-transitory computer readable storage medium of claim 15, wherein the instructions further cause the processor to:

receive, at a user interface of the client device in communication with the content management system, a request to search for existing content within the content management system;

provide, at the user interface, an indication of the records folders hierarchy;

receive, at the user interface, an input indicative of the selected records folder within the records folders hierarchy; and associate the searched-for content with the selected records folder, in response to the input.

18. The non-transitory computer readable storage medium of claim 15, wherein the instructions further cause the processor to:

receive, at a user interface of the client device in communication with the content management system, an input indicative of checking in content into the content management system;

determine a match between metadata associated with the content to be checked in, and one or more rules corresponding to the selected records folder; and in response to determining the match, associate the content to be checked in, with the selected records folder.

* * * * *